(12) United States Patent
Hsu et al.

(10) Patent No.: US 8,904,602 B2
(45) Date of Patent: Dec. 9, 2014

(54) CONNECTING DEVICE CAPABLE OF OPENING AND ENGAGING IN DUAL DIRECTIONS

(71) Applicant: Jarllytec Co., Ltd., New Taipei City (TW)

(72) Inventors: Yu-Tsun Hsu, New Taipei (TW); Yin-Min Yeh, New Taipei (TW)

(73) Assignee: Jarllytec Co., Ltd., New Taipei (TW)

( * ) Notice: Subject to any disclaimer, the term of this patent is extended or adjusted under 35 U.S.C. 154(b) by 0 days.

(21) Appl. No.: 14/148,710

(22) Filed: Jan. 6, 2014

(65) Prior Publication Data

US 2014/0331453 A1 Nov. 13, 2014

(30) Foreign Application Priority Data

May 10, 2013 (TW) .............................. 102116785 A
Aug. 5, 2013 (TW) .............................. 102127917 A

(51) Int. Cl.
*E05D 3/06* (2006.01)
*E05D 7/02* (2006.01)

(52) U.S. Cl.
CPC ........................................ *E05D 7/02* (2013.01)
USPC ................................. 16/366; 16/282; 16/288

(58) Field of Classification Search
USPC .................. 16/277, 282, 284, 285, 288, 359, 16/361–362, 363, 366, 368, 369, 370, 374
See application file for complete search history.

(56) References Cited

U.S. PATENT DOCUMENTS

| | | | | | |
|---|---|---|---|---|---|
| 167,900 | A | * | 9/1875 | House .............................. | 16/285 |
| 397,190 | A | * | 2/1889 | Keene .............................. | 16/273 |
| 1,008,381 | A | * | 11/1911 | Soss ................................. | 16/282 |
| 4,703,540 | A | * | 11/1987 | Davis ............................... | 16/337 |
| 4,726,092 | A | * | 2/1988 | Tacheny et al. ................. | 16/364 |
| 6,374,459 | B1 | * | 4/2002 | Zetti ................................ | 16/366 |
| 7,350,273 | B1 | * | 4/2008 | Skipper ........................... | 16/366 |
| 7,574,775 | B2 | * | 8/2009 | Zetti ................................ | 16/370 |

* cited by examiner

*Primary Examiner* — Roberta Delisle
(74) *Attorney, Agent, or Firm* — Guice Patents PLLC

(57) ABSTRACT

The present invention relates to a connecting device capable of opening and engaging in dual directions, which includes: a supporter; a corresponding supporter capable of being engaged with the supporter; and two connection bars parallel to each other, each of the connection bars is respectively parallel to the supporter and the corresponding supporter, and two ends of each of the connection bars are respectively pivoted with the supporter and the corresponding supporter thereby allowing the corresponding supporter to be rotated and unfolded towards an end direction of the supporter or to be rotated and unfolded towards an opposite end direction of the supporter so as to form the dual-directional opening operation.

12 Claims, 15 Drawing Sheets

US 8,904,602 B2

CONNECTING DEVICE CAPABLE OF OPENING AND ENGAGING IN DUAL DIRECTIONS

BACKGROUND OF THE INVENTION

1. Field of the Invention

The present invention relates to a connecting device capable of opening and engaging in dual directions, especially to a connecting device capable of opening and engaging in dual directions which is suitable to be applied in an electronic product equipped with a display thereby proving a dual-directional opening effect to the display; the mentioned display can be a screen or a touch screen.

2. Description of Related Art

A general electronic product is mainly composed of a screen and a machine housing (e.g. a keyboard, an image capturing device and an expansion dock), with the well-developed technology, the volume and dimension of the electronic product (e.g. a digital camera, a notebook computer or a mobile phone) is able to be reduced, and a touch screen is gradually adopted as the screen of the electronic product; so when being used, the screen (or the touch screen) is able to be horizontally rotated relative to the machine housing, or even be vertically rotated; the mechanism or device adopted for achieving the mentioned horizontal rotating operation can utilize a biaxial hinge (e.g. the thinned biaxial hinge disclosed in the Taiwan Patent No. M441303), the biaxial hinge mainly includes a frame composed of two connection sheets parallel to each other, a first rotation shaft and a second rotation shaft disposed with a parallel manner between the two connection sheets, the first and the second rotation shafts are arranged in an inclined format when being engaged to zero degree thereby allowing the thickness of the screen and the machine housing to be thinner while being engaged with each other; the mechanism or device adopted for achieving the mentioned horizontal rotating operation and the vertical rotating operation can utilize a biaxial rotating hinge (e.g. the hinge with rotation displacement function disclosed in the Taiwan Patent No. M368727), the hinge with rotation displacement function includes a supporter having a lateral sheet, three rotation shafts, two fasten racks and a fasten sheet, the three rotation shafts includes two first rotation shafts horizontally disposed on the lateral sheet of the supporter and a second rotation shaft vertically disposed on the supporter, the two fasten racks are respectively disposed at shaft ends of the two first rotation shafts, the fasten sheet is disposed at a shaft end of the second rotation shaft, and the hinge is provided with two protrusions on a mobile cam, a fixed cam is provided a first guiding piece and a second guiding piece formed with a guiding curved surface; when a screen is rotated for being opened, the supporter drives a core axis of the first rotation shaft fastened on the supporter and the mobile cam sleeved on the core axis for being synchronously rotated, so the protrusions are enabled to be moved along the guiding curved surface thereby allowing the mobile cam, the core axis and the supporter to be displaced and the screen to be gradually displaced towards outward, the distance defined between the screen and the machine housing (i.e. the main body of the machine) is increased thereby allowing the screen to be smoothly opened without being interfered by the machine housing, and a gap could be avoided from being generated between the screen and the machine housing.

SUMMARY OF THE INVENTION

The mentioned biaxial hinge disclosed in the Taiwan Patent No. M441303 and the biaxial rotating hinge disclosed in the Taiwan Patent No. M368727 both includes a frame (two connection sheets), a supporter or fasten racks, the thickness and the height of the mentioned components would occupy the installation space, so when being installed with the screen (or the touch screen) and the machine housing, a sufficient space (e.g. installation depth) is required for installing the hinge, thereby limiting the effect of making the screen (or the touch screen) and the machine housing to be thinner; on the other hand, a conventional screen can only be horizontally rotated in single direction and cannot be horizontally rotated in dual directions, so when designing a digital camera, the design flexibility is restrained by the location where the function key is installed or the desired outlook of the housing; the present invention is aimed to improve the two disadvantages mentioned above.

One primary objective of the present invention is to provide a connecting device capable of opening and engaging in dual directions, two supporters capable of being mutually engaged are designed to be respectively connected to the screen and the machine housing of an electronic product, and two connection bars parallel to each other are installed, an effect of making the connecting device in the engaged status to be thinner can be achieved, and the screen is enabled to be rotated and unfolded in two opposite directions along with the two connection bars, thereby allowing the screen to be unfolded and engaged in sequence.

For achieving the above-mentioned objective, the present invention provides a connecting device capable of opening and engaging in dual directions, which includes: a supporter; a corresponding supporter engaged with the supporter; and two connection bars parallel to each other, each of the connection bars is respectively parallel to the supporter and the corresponding supporter, two ends of each of the connection bars are respectively pivoted with the supporter and the corresponding supporter, so the corresponding supporter is allowed to be rotated and unfolded towards an end direction of the supporter, or rotated and unfolded towards an opposite end direction of the supporter, thereby forming the dual-directional opening operation.

For achieving the above-mentioned objective, the present invention provides a connecting device capable of opening and engaging in dual directions, which includes: a supporter; a connecting supporter pivoted with the supporter and capable of being mutually engaged; a corresponding supporter pivoted with the connecting supporter and capable of being mutually engaged, thereby enabling the connecting supporter to be disposed between the supporter and the corresponding supporter; and two connection bars parallel to each other, and disposed at two opposite sides of the supporter, the corresponding supporter and the connecting supporter capable of being mutually engaged, wherein one end of the corresponding supporter is pivoted with one end of the connecting supporter, two ends of each of the connection bars are respectively pivoted with one end of the supporter and the opposite end of the corresponding supporter, and the opposite end of the connecting supporter is pivoted with the opposite end of the supporter, so the corresponding supporter and the two connection bars are allowed to be rotated and unfolded towards an end direction of the supporter, or the corresponding supporter and the connecting supporter are allowed to be rotated and unfolded towards an opposite end direction of the supporter, thereby forming the dual-directional opening operation.

Accordingly, the present invention provides a connecting device capable of opening and engaging in dual directions designed to be installed with one supporter, one corresponding supporter and two connection bars, so a dual-directional opening effect is provided, when being applied in an image capturing device such as a digital camera, the screen is enabled to be rotated and adjusted towards a direction corresponding to the high or low image capturing location thereby providing convenience to users; when being engaged, the volume is able to be reduced due to the thinner design, so the whole thickness is less likely to be affected by the installation of the supporter and is enabled to be similar or equal to the thickness of the hinge thereby being facilitated to be hidden and installed on the screen or a side wall of the machine housing so the appearance is prettified and the convenience in use is provided.

DETAILED DESCRIPTION OF THE PREFERRED EMBODIMENT

Referring from FIG. 1 to FIG. 7, the connecting device capable of opening and engaging in dual directions provided by the present invention includes a supporter (10), a corresponding supporter (20) and two connection bars (30, 40). The corresponding supporter (20) is able to be engaged with the supporter (10), and the corresponding supporter (20) and the supporter (10) are arranged with a mutually parallel means. Each of the connection bars (30, 40) is respectively parallel to the supporter (10) and the corresponding supporter (20), and two ends of each of the connection bars (30, 40) are respectively pivoted with the supporter (10) and the corresponding supporter (20), thereby enabling the corresponding supporter (20) to be rotated and unfolded towards an end direction (D1) of the supporter (10) or to be rotated and unfolded towards an opposite end direction (D2) of the supporter (10) so as to form the dual-directional opening operation.

Figure 2:
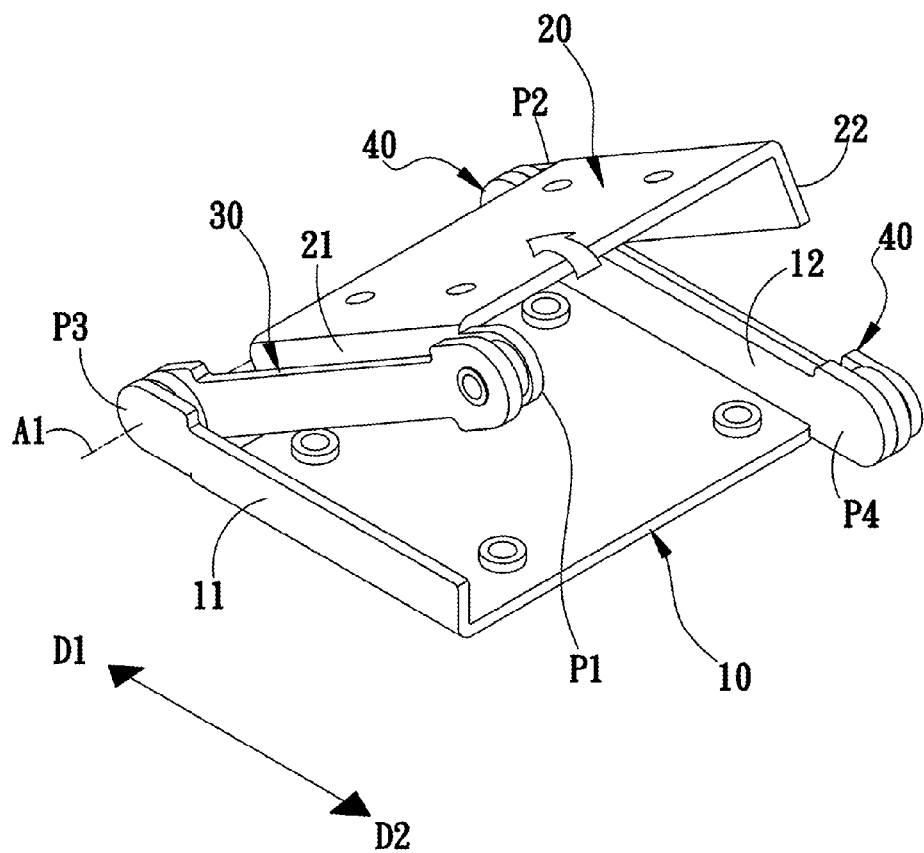
FIG. 2 is a schematic view illustrating the corresponding supporter shown in FIG. 1 being rotated and unfolded towards one direction.
Figure 3:
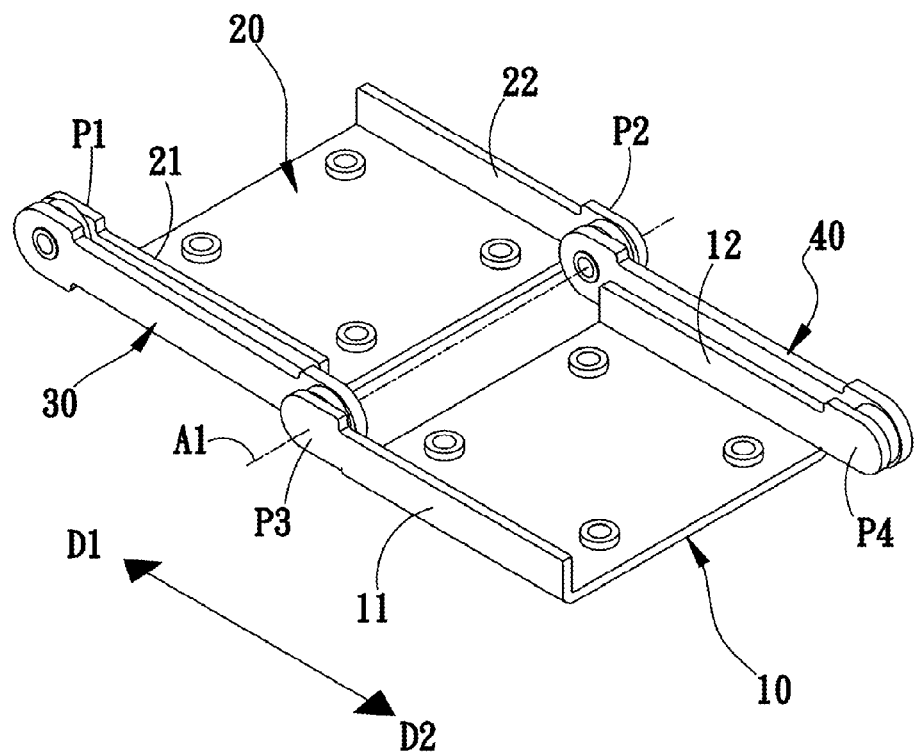
FIG. 3 is a schematic view illustrating the corresponding supporter shown in FIG. 2 being rotated to 180 degrees relative to the supporter.
Figure 4:
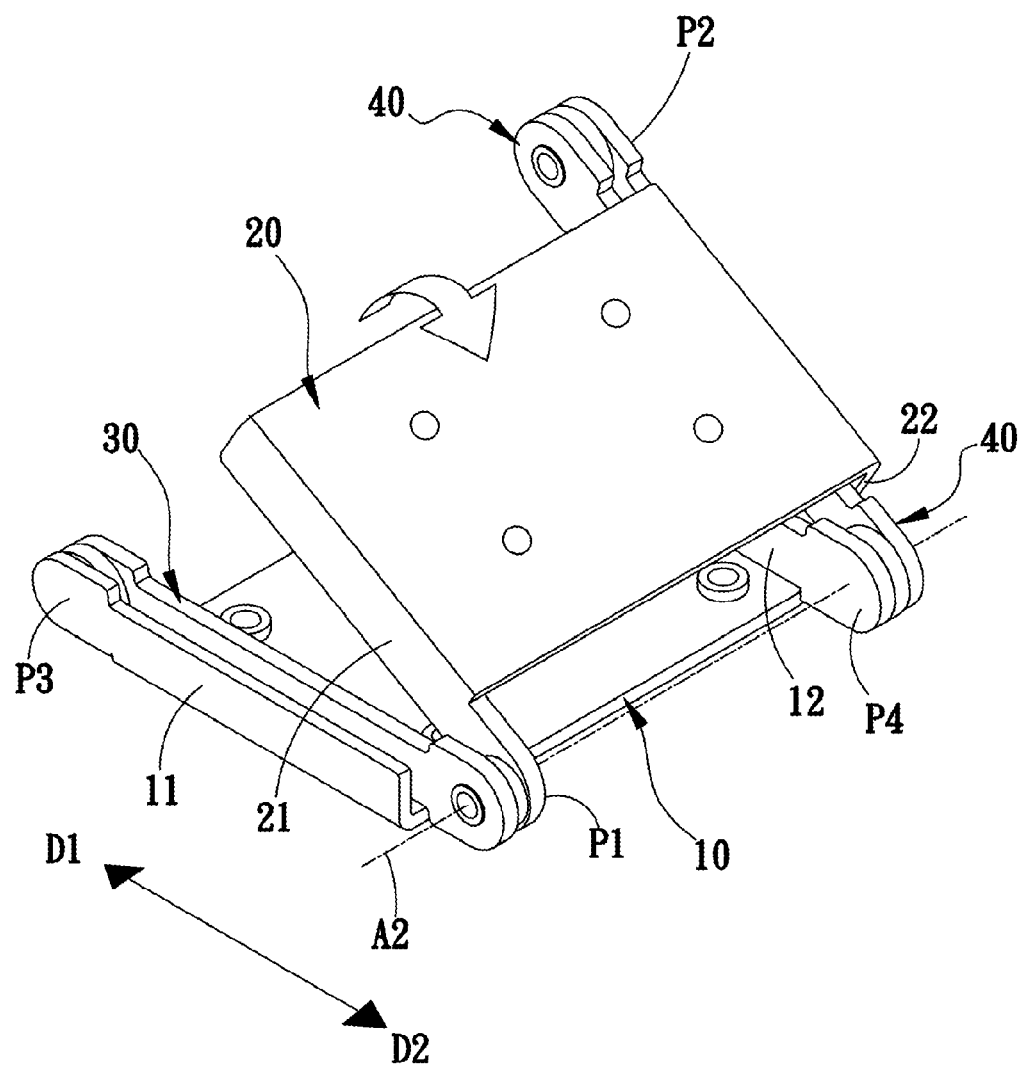
FIG. 4 is a schematic view illustrating the corresponding supporter shown in FIG. 1 being rotated and unfolded towards another direction.

As shown in FIG. 2 and FIG. 3, two opposite sides of the supporter (10) are respectively provided with a first bending sheet (11) and a second bending sheet (12), two opposite sides of the corresponding supporter (20) are respectively provided with a third bending sheet (21) and a fourth bending sheet (22); when being in an engaged status, the third bending sheet (21) or the fourth bending sheet (22) is abutted against the supporter (10), and the first bending sheet (11) or the second bending sheet (12) is abutted against the corresponding supporter (20), thereby generating a gap (G) due to the mutual support provided by the supporter (10) and the corresponding supporter (20) when the corresponding supporter (20) being engaged with the supporter (10); in actual practice, the third and the fourth bending sheets (21, 22) can also be respectively abutted against the first and the second bending sheets (11, 12) and the gap (G) is also enabled to be generated.

Figure 5:
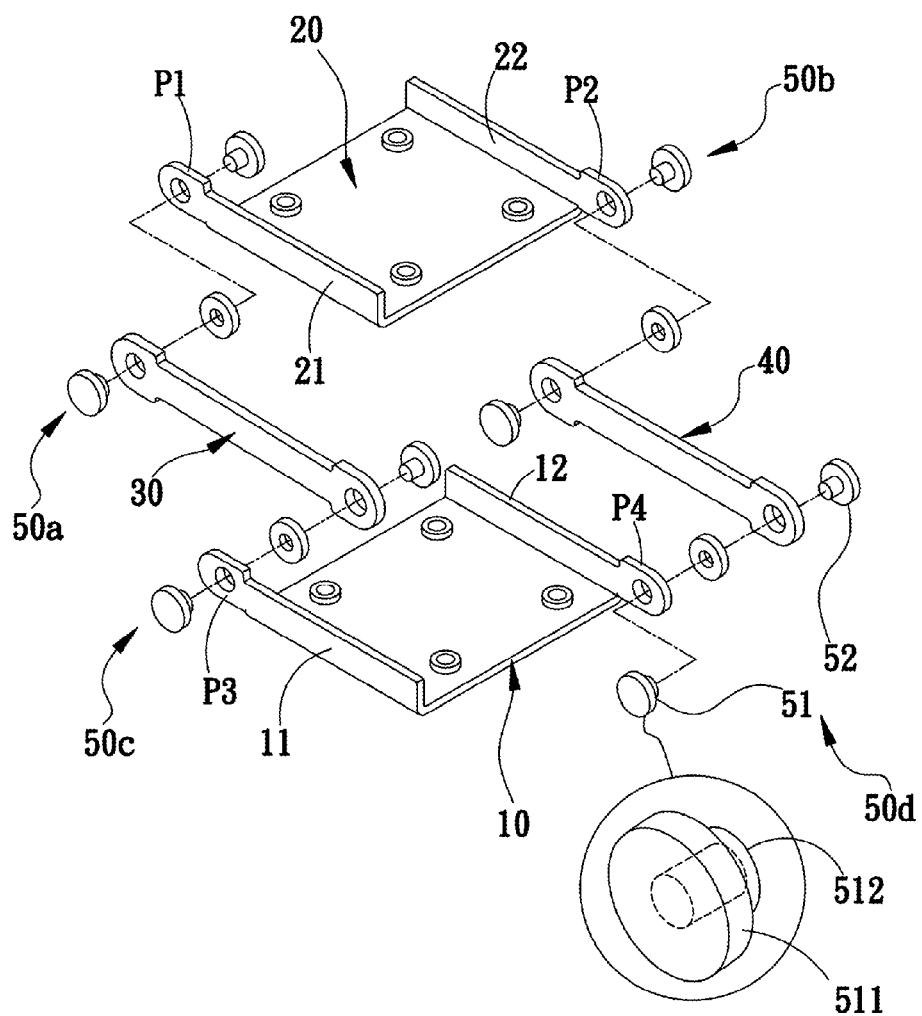
FIG. 5 is a perspective exploded view illustrating the connecting device shown in FIG. 3 being respectively installed with a pivotal shaft at the locations where the connection bars and the first and the second and the third and the fourth bending sheets being pivoted.

In actual practice, the dimension of the supporter (10) and the dimension of the corresponding supporter (20) can be the same or different, for allowing the supporter (10) and the corresponding supporter (20) having different dimension to be mutually engaged or allowing the supporter (10) and the corresponding supporter (20) having the same dimension to be staggeringly engaged, as shown in FIG. 5 (also referring to FIG. 6 and FIG. 7), a pivotal shaft (50a, 50b, 50c, 50d) is respectively installed at the location where each of the connection bars (30, 40), the first bending sheet (11), the second bending sheet (12), the third bending sheet (21) and the fourth bending sheet (22) are pivoted, the four pivotal shafts (50a, 50b, 50c, 50d) are arranged with a means of every two being coaxial with each other, and the two coaxial pivotal shafts (50b, 50c) are parallel to the other two coaxial pivotal shafts (50a, 50d), so the supporter (10) and the corresponding supporter (20) having the same or different dimension are enabled to be horizontally displaced relative to each other in the axial direction, thereby being staggeringly engaged or correspondingly engaged.

Referring from FIG. 1 to FIG. 4, according to the connecting device capable of opening and engaging in dual directions provided by the present invention, two opposite ends of the supporter (10) are respectively installed with a third pivotal part (P3) and a fourth pivotal part (P4); the corresponding supporter (20) is engaged with the supporter (10), two opposite ends of the corresponding supporter (20) are respectively installed with a first pivotal part (P1) and a second pivotal part (P2); the two connection bars (30, 40) are arranged in parallel, wherein two ends of the connection bar (30) are respectively pivoted with the first pivotal part (P1) and the third pivotal part (P3), and two ends of the other connection bar (40) are respectively pivoted with the second pivotal part (P2) and the fourth pivotal part (P4), so the corresponding supporter (20) and the connection bar (30) are allowed to respectively utilize the second and the third pivotal parts (P2, P3) as a rotation axis for being rotated and unfolded towards the end direction (D1) of the supporter (10), or the corresponding supporter (20) and the other connection bar (40) are allowed to respectively utilize the first and the fourth pivotal parts (P1, P4) as a rotation axis for being rotated and unfolded towards the opposite end direction (D2) of the supporter (10) thereby forming the dual-directional opening operation, the whole thickness and area defined while the supporter (10) and the corresponding supporter (20) being engaged is able to be reduced thereby achieving the advantages of being thinner and occupying less space; and the two connection bars (30, 40) can be respectively served to work with an unfolding operation towards a certain direction so the corresponding supporter (20) is prevented from being released from the supporter (10) and the stable rotating and unfolding operation can be ensured, thus when the corresponding supporter (20) is rotated and unfolded towards the end direction (D1), the corresponding supporter (20) has to be engaged with the supporter (10) before being rotated and unfolded towards the opposite end direction (D2), and vice versa.

Figure 1:
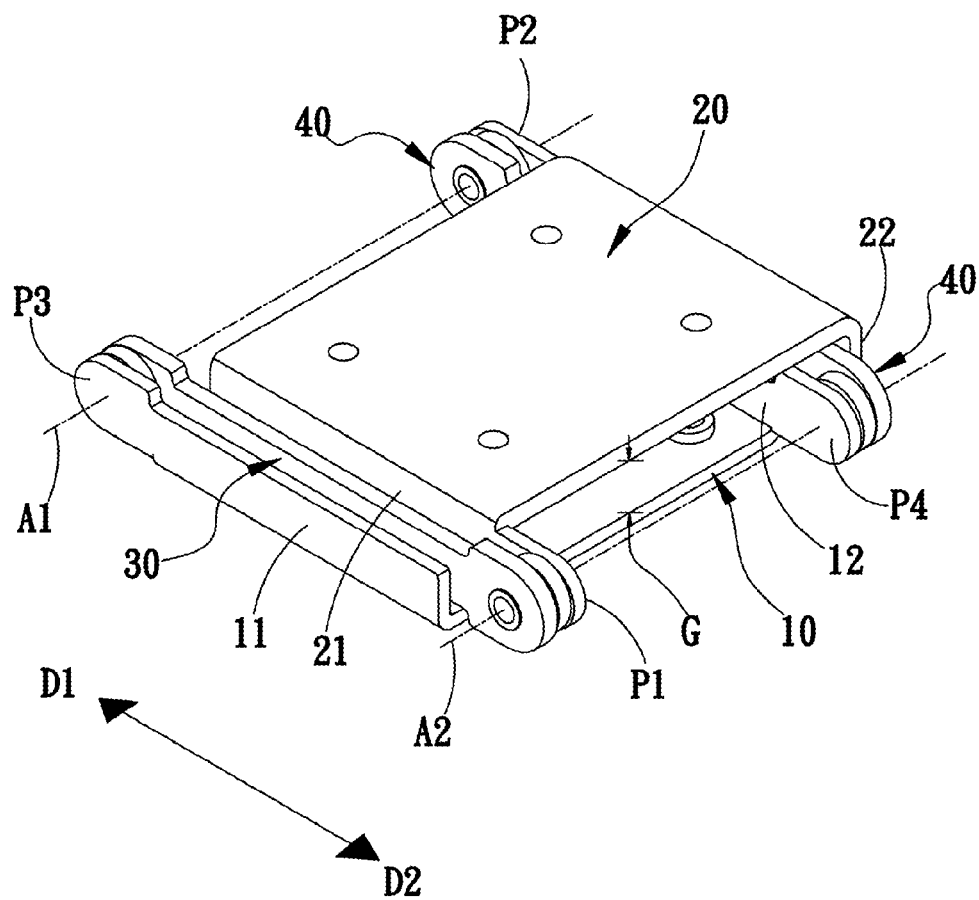
FIG. 1 is a perspective view illustrating the connecting device capable of opening and engaging in dual directions being in an engaged status according to the first embodiment of the present invention.

In actual practice, the first and the second pivotal parts (P1, P2) at the two opposite ends (defined as the top and the bottom end) of the corresponding supporter (20) and the third and the fourth pivotal parts (P3, P4) at the two opposite ends (defined as the top and the bottom end) of the supporter (10) can all be arranged at corners, referring to FIG. 1 and FIG. 3, the first pivotal part (P1) and the second pivotal part (P2) are respectively extended from two opposite corners of the corresponding supporter (20), the third pivotal part (P3) and the fourth pivotal part (P4) are respectively extended from two opposite corners of the supporter (10); the two connection bars (30, 40) parallel to each other are respectively in parallel to the corresponding supporter (20) and the supporter (10), and two ends of the connection bar (30) are respectively aligned with the first pivotal part (P1) and the second pivotal part (P2), and two ends of the other connection bar (40) are respectively aligned with the third pivotal part (P3) and the fourth pivotal part (P4), thereby enabling the second and the third pivotal parts (P2, P3) to be at an axial line (A1) and the first and the fourth pivotal parts (P1, P4) to be at another axial line (A2).

Because two opposite sides of the supporter (10) are respectively provided with the first bending sheet (11) and the second bending sheet (12), in actual practice, the third pivotal part (P3) is able to be extended from the first bending sheet (11) towards the end direction (D1) of the supporter (10), the fourth pivotal part (P4) is able to be extended from the second bending sheet (12) towards the opposite end direction (D2) of the supporter (10), and the third and the fourth pivotal parts (P3, P4) are respectively arranged at two opposite corners of the supporter (10); two opposite sides of the corresponding supporter (20) are respectively provided with the third bending sheet (21) and the fourth bending sheet (22), the first pivotal part (P1) is able to be extended from the third bending sheet (21) towards the end direction (D1) of the corresponding supporter (20), the second pivotal part (P2) is able to be extended from the fourth bending sheet (22) towards the opposite end direction (D2) of the corresponding supporter (20), and the first and the second pivotal parts (P1, P2) are respectively arranged at two opposite corners of the corresponding supporter (20), thereby generating the gap (G) due to the mutual support provided by the supporter (10) and the corresponding supporter (20) when the corresponding supporter (20) being engaged with the supporter (10), so wires are allow to pass or be hidden therein, and the whole appearance can be prettified and more quality is provided.

Figure 6:
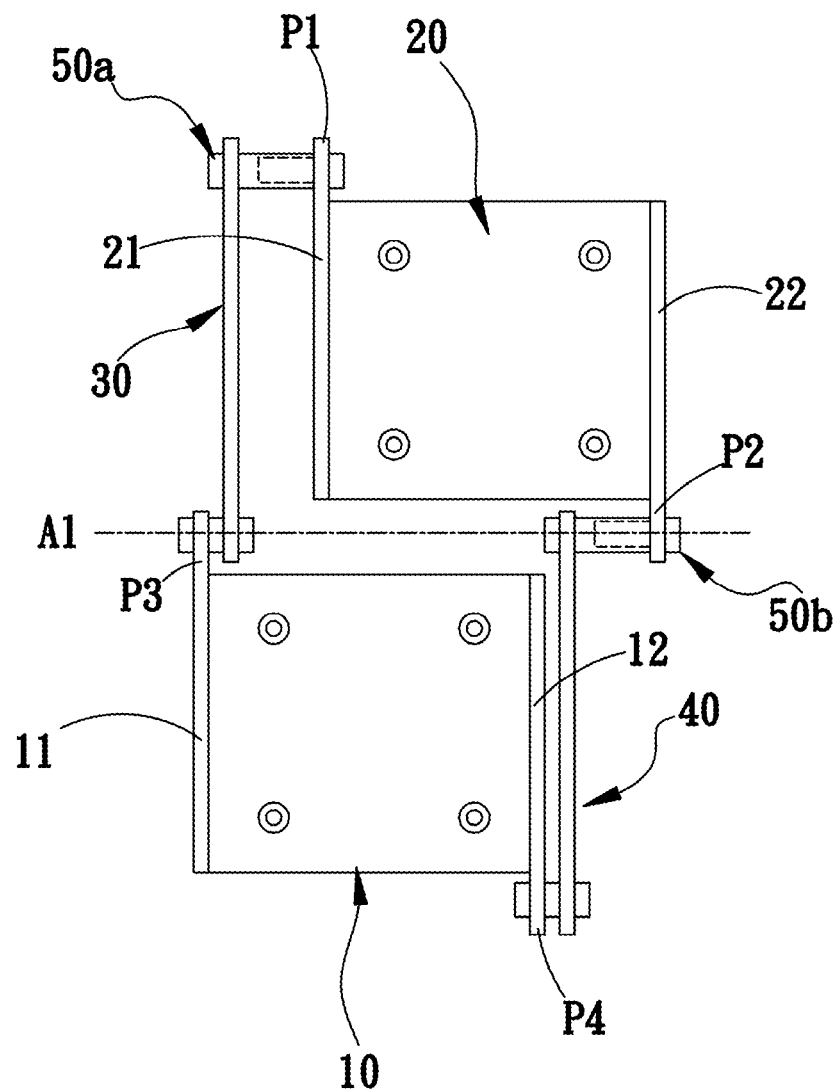
FIG. 6 is a schematic view illustrating the corresponding supporter shown in FIG. 5 being horizontally displaced relative to the supporter after the pivotal shafts being additionally installed according to the first embodiment of the present invention.
Figure 7:
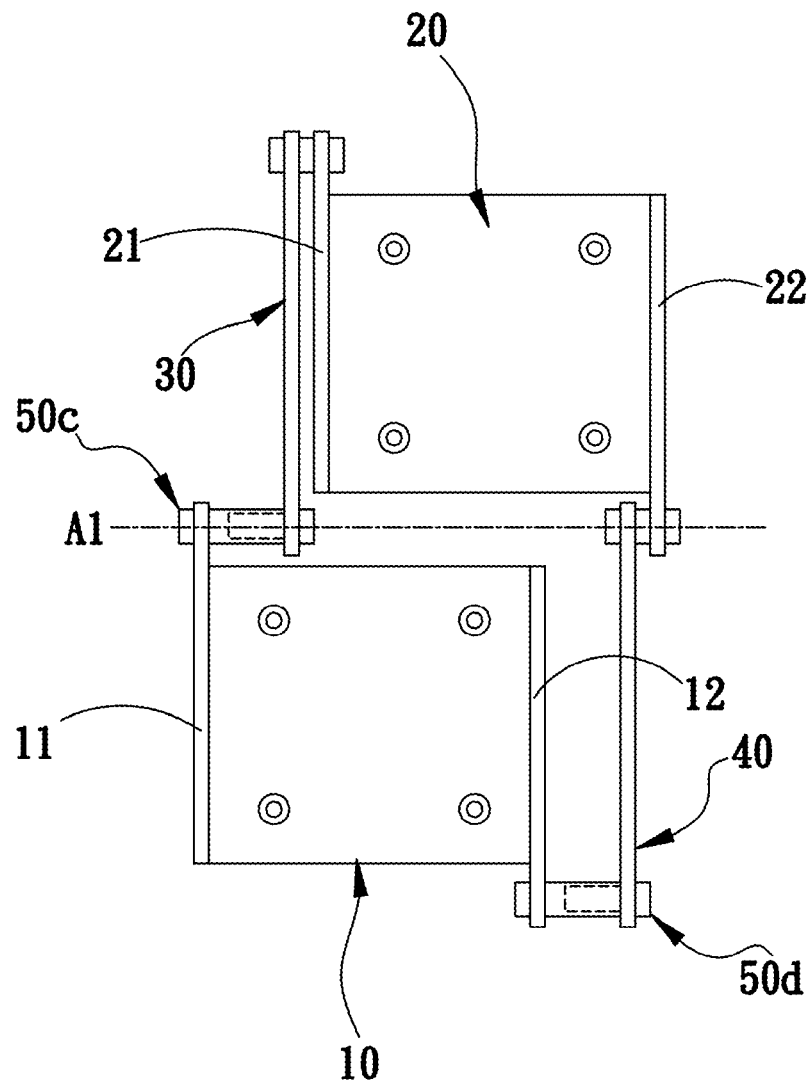
FIG. 7 is a schematic view illustrating the supporter shown in FIG. 5 being horizontally displaced relative to the corresponding supporter after the pivotal shafts being additionally installed according to the first embodiment of the present invention.

According to the present invention, the first, the second, the third and the fourth pivotal parts (P1, P2, P3, P4) can be optionally installed with a pivotal shaft according to the actual needs, as shown in FIG. 6, a pivotal shaft (50a, 50b) is respectively installed between the connection bar (30) and the first pivotal part (P1) and between the other connection bar (40) and the second pivotal part (P2), the pivotal shafts (50a, 50b) are parallel to each other, thereby enabling the corresponding supporter (20) to be horizontally displaced in the axial direction relative to the supporter (10) so as to be staggeringly engaged or correspondingly engaged; or as shown in FIG. 7, a pivotal shaft (50c, 50d) is respectively installed between the connection bar (30) and the third pivotal part (P3) and between the other connection bar (40) and the fourth pivotal part (P4), the pivotal shafts (50c, 50d) are parallel to each other, thereby enabling the supporter (10) to be horizontally displaced in the axial direction relative to the corresponding supporter (20) so as to be staggeringly engaged or correspondingly engaged.

According to the embodiment provided by the present invention, each of the pivotal shafts (50a, 50b, 50c, 50d) includes an axial core member (51) and a fasten member (52) pivotally connected to each other, two ends of the axial core member (51) are respectively formed as a stop part (511) and a connection part (512), the fasten member (52) is correspondingly pivoted with the connection part (512), thereby enabling each of the pivotal shafts (50a, 50b, 50c, 50d) to be easily detached, assembled and replaced, so the present invention is provided an adjustable effect and the operation convenience is also provided.

In addition, when the present invention is applied in a machine housing of an electronic product (e.g. a digital camera, a notebook computer, a mobile phone) or a screen (e.g. a touch screen), less space is occupied, and the gap generated while the machine housing and the screen (or the touch screen) being engaged can be reduced, so the screen is enabled to be mounted on the surface of the machine housing, for example, for allowing the present invention to be disposed in an accommodation slot (not shown in figures) formed on the surface of the machine housing, the supporter (10) is connected to the machine housing, the corresponding supporter (20) is connected to the backside of the screen (or the touch screen), when a user lifts and unfolds the screen (or the touch screen), the screen of the electronic product is provided with a dual-directional opening effect, the supporter can also be connected to the screen and the corresponding supporter is connected to the machine housing, the same dual-directional opening effect is also provided.

Referring from FIG. 8 to FIG. 15, the connecting device capable of opening and engaging in dual directions disclosed in the second embodiment of the present invention includes a supporter (10'), a connecting supporter (60), a corresponding supporter (20') and two connection bars (30', 40'). The connecting supporter (60) is pivoted with the supporter (10') and capable of being mutually engaged; the corresponding supporter (20') is pivoted with the connecting supporter (60) and capable of being mutually engaged, thereby enabling the connecting supporter (60) to be disposed between the supporter (10') and the corresponding supporter (20'). The two connection bars (30', 40') are parallel to each other and disposed at two opposite sides of the supporter (10'), the corresponding supporter (20') and the connecting supporter (60) capable of being mutually engaged, wherein one end of the corresponding supporter (20') is pivoted with one end of the connecting supporter (60), two ends of each of the connection bars (30', 40') are respectively pivoted with one end of the supporter (10') and the opposite end of the corresponding supporter (20'), and the opposite end of the connecting supporter (60) is pivoted with the opposite end of the supporter (10'), so the corresponding supporter (20') and the two connection bars (30', 40') are allowed to respectively utilize one end of the connecting supporter (60) and one end of the supporter (10') as a rotation axis (i.e. the axial line A1) for being rotated and unfolded towards an end direction (D1) of the supporter (10') (referring to FIG. 9), or the corresponding supporter (20') and the connecting supporter (60) are allowed to respectively utilize the opposite end of each of the connection bars (30', 40') and the opposite end of the supporter (10') as a rotation axis (i.e. the axial line A2) for being rotated and unfolded towards an opposite end direction (D2) of the supporter (10') (referring to FIG. 10) thereby forming the dual-directional opening operation.

The difference between the second embodiment and the first embodiment disclosed from FIG. 1 to FIG. 7 is that: the connecting supporter (60) is additionally installed between the supporter (10') and the corresponding supporter (20'), so beside the first to the fourth pivotal parts (P1~P4), fifth to eighth pivotal parts (P5~P8) are respectively installed on the supporter (10') and the corresponding supporter (20'); one end of each of the connection bars (30', 40') is respectively pivoted with one end of the supporter (10'), the other end of each of the connection bars (30', 40') is respectively pivoted with the opposite end of the corresponding supporter (20') (referring to FIG. 1 and FIG. 2 discloses in the first embodiment, each of the pivotal parts is staggeringly arranged, one end of the connection bar (30) is pivoted with one end of the corresponding supporter (20) (the first pivotal part P1), the other end (or the opposite end) of the connection bar (30) is pivoted with one end of the supporter (10) (the third pivotal part P3), one end of the other connection bar (40) is pivoted with the opposite end of the corresponding supporter (20) (the second pivotal part P2), the other end (or the opposite end) of the other connection bar (40) is pivoted with the opposite end of the supporter (10) (the fourth pivotal part P4)); thus the technical means provided by the second embodiment for achieving the dual-directional opening operation is different from what has been disclosed in the first embodiment.

Figure 8:
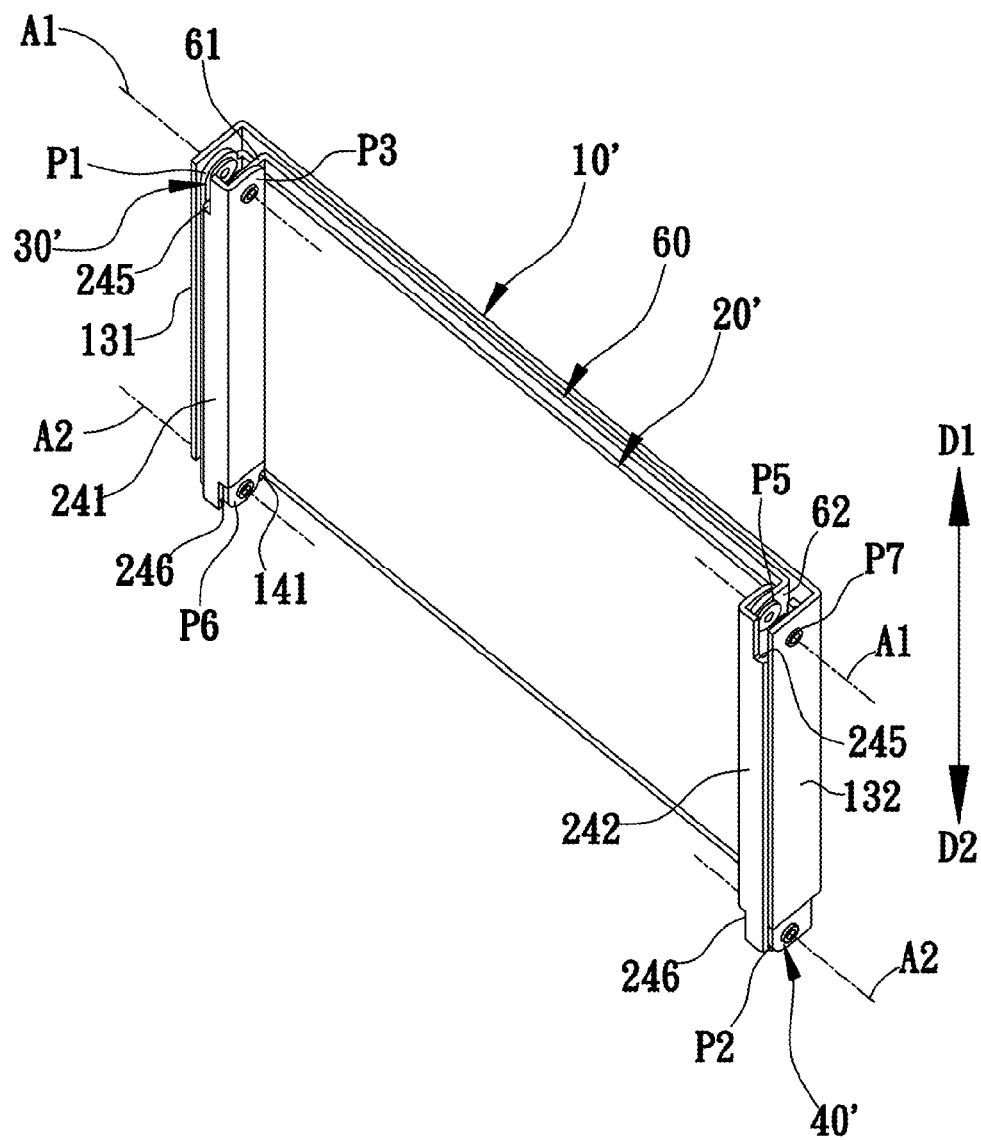
FIG. 8 is a perspective view illustrating the connecting device capable of opening and engaging in dual directions being in an engaged status according to the second embodiment of the present invention.
Figure 9:
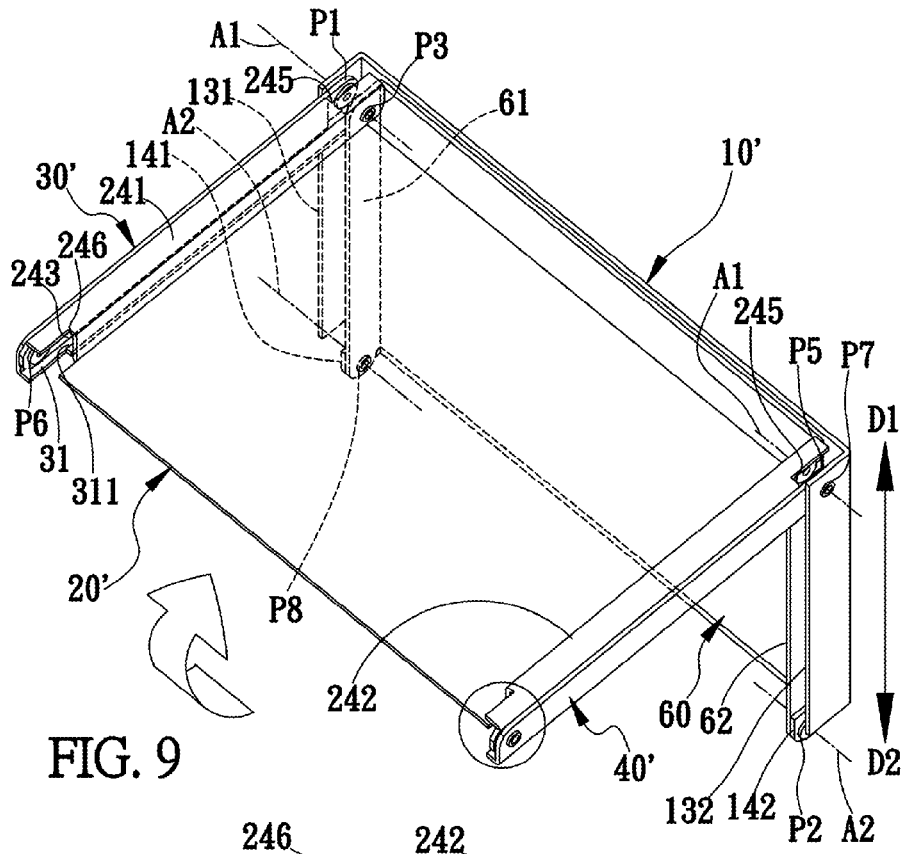
FIG. 9 is a schematic view illustrating the two connection bars shown in FIG. 8 being rotated and unfolded towards one direction with the corresponding supporter.
Figure 10:
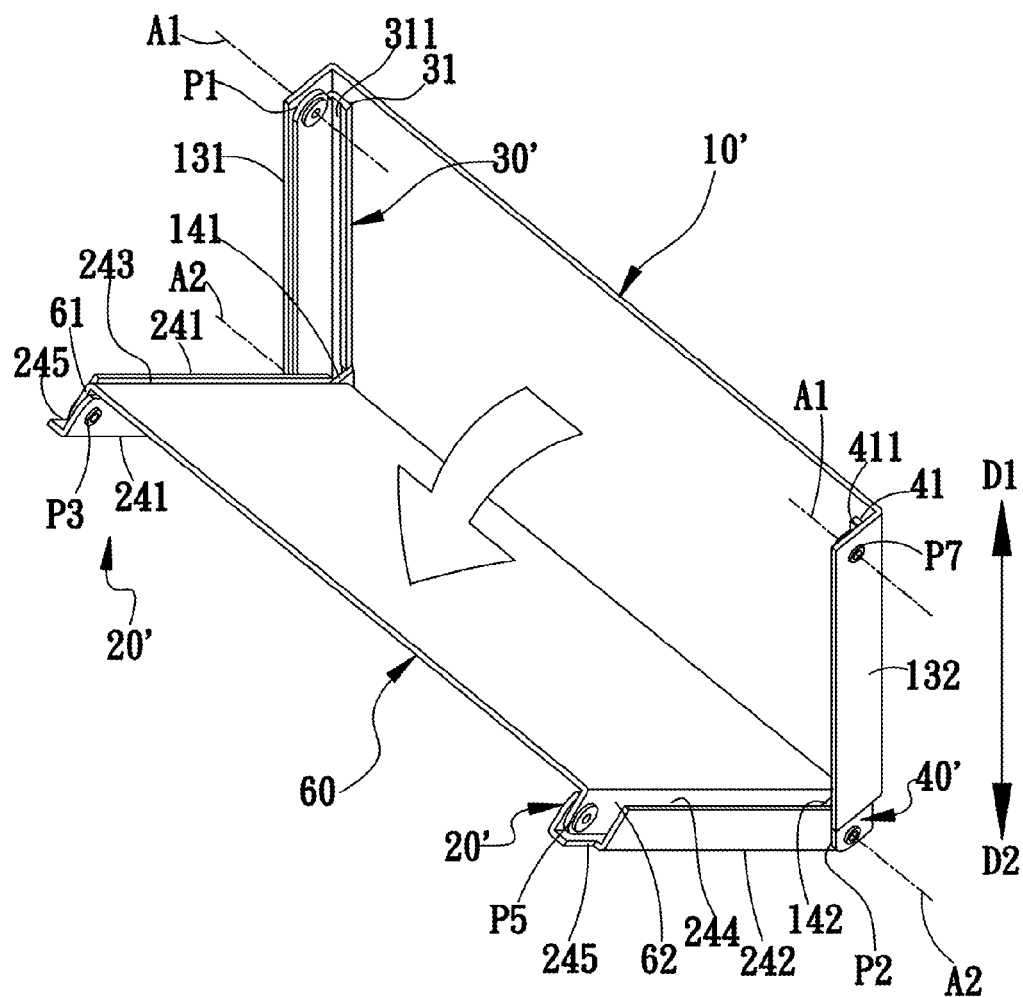
FIG. 10 is a schematic view illustrating the connecting supporter shown in FIG. 8 being rotated and unfolded towards another direction with the corresponding supporter.
Figure 11:
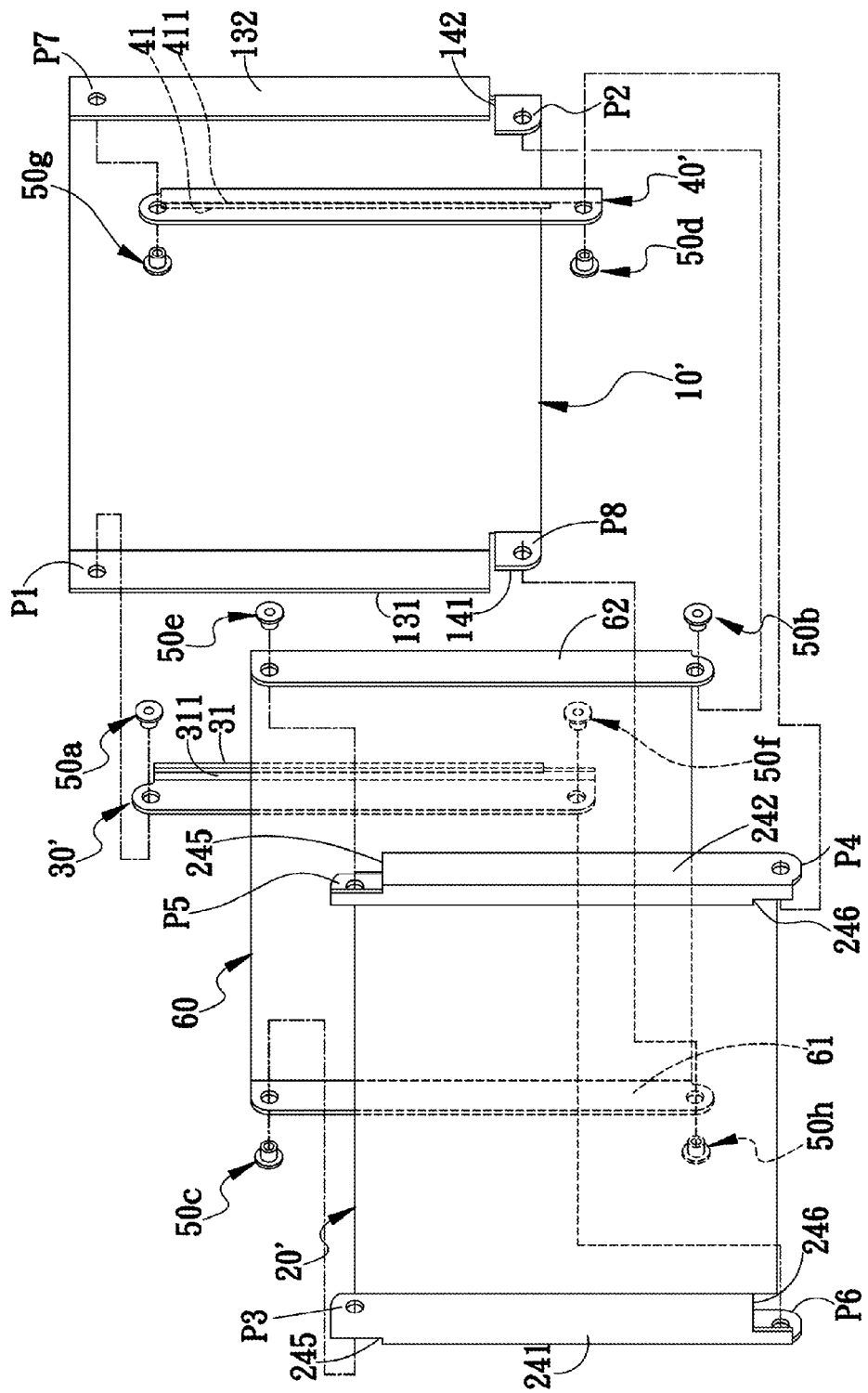
FIG. 11 is a perspective exploded view illustrating the connecting device capable of opening and engaging in dual directions according to the second embodiment of the present invention.

The installed locations of the first to the eighth pivotal parts (P1~P8) are as shown in FIG. 11, the first pivotal part (P1) and the seventh pivotal part (P7) are respectively installed at two sides defined at one end of the supporter (10'), the eighth pivotal part (P8) and the second pivotal part (P2) are respectively installed at two sides defined at the opposite end of the supporter (10'); the third pivotal part (P3) and the fifth pivotal part (P5) are respectively installed at two sides defined at one end of the corresponding supporter (20'), the sixth pivotal part (P6) and the fourth pivotal part (P4) are respectively installed at two sides defined at the opposite end of the corresponding supporter (20'); the connecting relations of each of the pivotal parts and each of the connection bars (30', 40') and the connecting supporter (60) are as shown from FIG. 8 to FIG. 10, two ends of the connection bar (30') are respectively pivoted with the first pivotal part (P1) and the sixth pivotal part (P6), two ends of the other connection bar (40') are respectively pivoted with the seventh pivotal part (P7) and the fourth pivotal part (P4); two sides defined at one end of the connecting supporter (60) are respectively pivoted with the third pivotal part (P3) and the fifth pivotal part (P5), two sides defined at the opposite end of the connecting supporter (60) are respectively pivoted with the eighth pivotal part (P8) and the second pivotal part (P2); the engaging status is as shown in FIG. 8, the first, the third, the fifth and the seventh pivotal parts (P1, P3, P5, P7) are located at the axial line A1, the sixth, the eighth, the fourth and the second pivotal parts (P6, P8, P4, P2) are located at the other axial line A2, thereby facilitating the dual-directional opening operation.

For allowing the thickness of the whole connecting device to be thinner when being in the engaged status, as shown from FIG. 9 to FIG. 11, two sides of the supporter (10') are respectively installed with outer block sheets (131, 132) and inner block sheets (141, 142) arranged with intervals, each of the connection bars (30', 40') are respectively accommodated and positioned between each of the inner block sheets (141, 142) and each of the outer block sheets (131, 132), the connecting supporter (60) is accommodated and positioned between each of the inner block sheets (141, 142) of the supporter (10'); two sides of the corresponding supporter (20') are respectively installed with a bending structure (241, 242) having an accommodation part (243, 244), two sides of the connecting supporter (60) are respectively installed with a corresponding bending structure (61, 62), each of the corresponding bending structures (61, 62) is guided and positioned in the accommodation part (243, 244) of each of the bending structures (241, 242); when being in the engaged status, the supporter (10'), the connecting supporter (60) and the corresponding supporter (20') are enabled to be mutually stacked for taking advantages of gaps formed in the three supporters, so less space is occupied, when being rotated and unfolded in dual directions, the connecting supporter (60) or the two connection bars (30', 40') are positioned in the supporter (10'), so the stability of the corresponding supporter (20') being rotated and unfolded can be ensured.

Figure 9A:
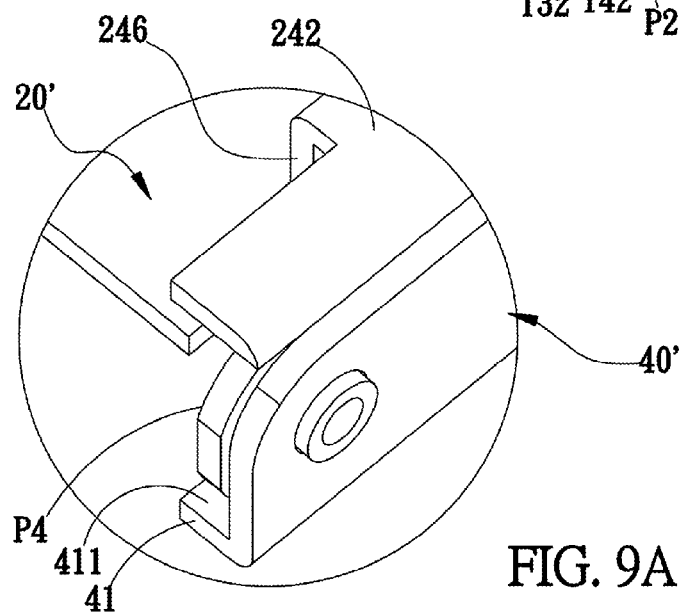
FIG. 9A is a partially enlarged view illustrating one pivotal part (the fourth pivotal part) of the corresponding supporter shown in FIG. 9.

One side of each of the connection bars (30', 40') is respectively installed with an extending part (31, 41), each of the extending parts (31, 41) is formed with a positioning groove (311, 411) allowing the edge of each of the bending structures (241, 242) to be abutted (referring to FIG. 9A), so the stability of the corresponding supporter (20') being unfolded and engaged can be ensured.

For reducing the affection caused by each of the pivotal parts when the dual-directional opening operation is performed, and for allowing the pivotal connection to be facilitated for the purpose of assembling and detaching, as shown in FIG. 10, the accommodation part (243, 244) of each of the bending structures (241, 242) is formed as an elongated groove formed through bending two sides of the corresponding supporter (20'), opposite corners of each of the elongated grooves are respectively formed with a notch (245, 246) for the purpose of pivotal connection; each of the corresponding bending structures (61, 62) is formed as a wing sheet formed through bending two sides of the connecting supporter (60), the distal end of each of the wind sheets is allowed to be exposed at the notch (245, 246) of each of the elongated grooves.

Figure 12:
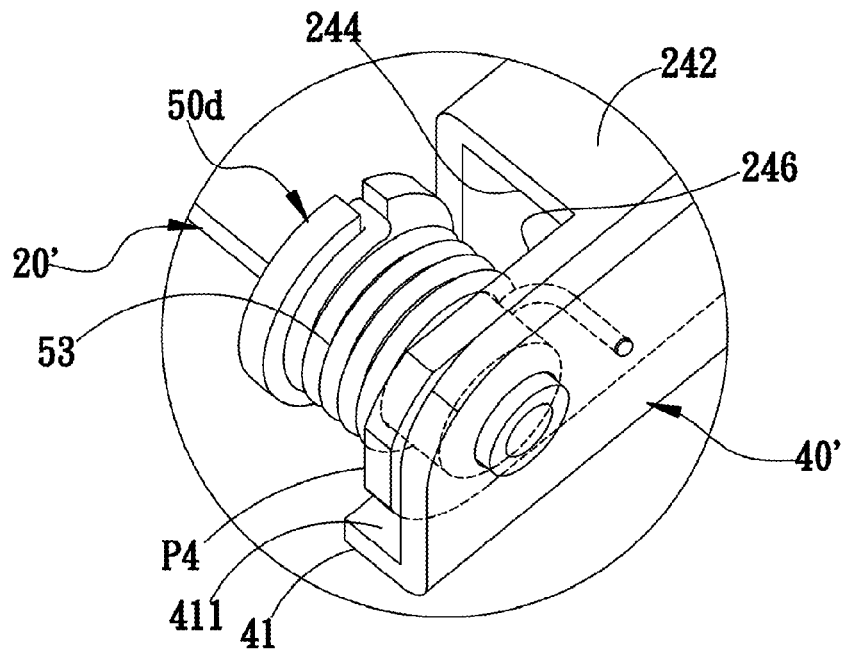
FIG. 12 is a schematic view illustrating the pivotal shaft shown in FIG. 9A being further sleeved with a torsion spring.
Figure 13:
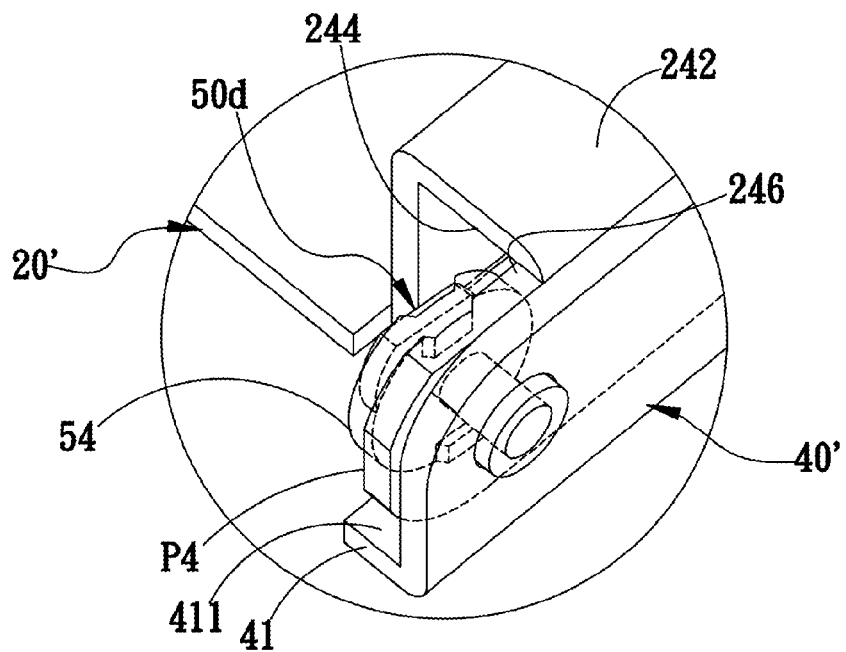
FIG. 13 is a schematic view illustrating the pivotal shaft shown in FIG. 9A being further installed with a cam structure, wherein the surfaces where the cam structure and the distal end of the corresponding supporter being in contact being respectively formed as a convex/concave surface.
Figure 14:
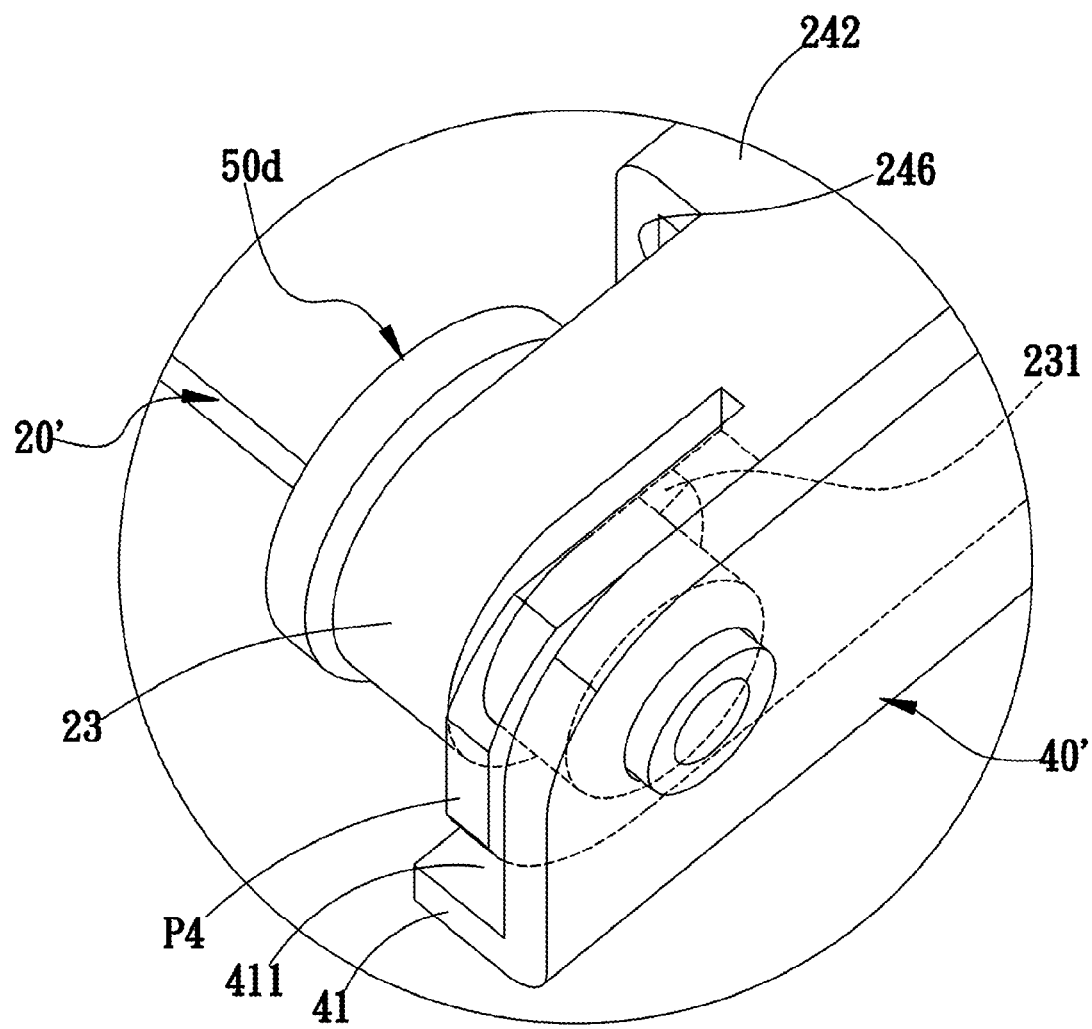
FIG. 14 is a schematic view illustrating the edge of the corresponding supporter being further extended with a covering segment covered the pivotal shaft.

Each of the pivotal parts of the supporter (10') and the corresponding supporter (20') is enabled to be directly pivoted with the connecting supporter (60) and the two connection bars (30', 40'), pivotal shafts (50a, 50b, 50c, 50d, 50e, 50f, 50g, 50h) can be respectively installed for facilitating the production, assembly and detachment, and the supporter (10') and the corresponding supporter (20') having different dimension are allowed to be matched with the connecting supporter (60) and the two connection bars (30', 40') for assembling the connecting device provided by the present invention; each of the pivotal shafts (50a-50h) can be further provided with a torque varying effect, as shown in FIG. 12, each of the pivotal shafts (50a-50h) is further respectively sleeved with a torsion spring (53) thereby forming a labor-saving hinge, so the corresponding supporter (20') can be easily rotated and unfolded; or as shown in FIG. 13, each of the pivotal shafts (50a-50h) is further installed with a cam structure (54), the cam structure (54) includes a cam and an end surface contacting the cam, the surfaces where the cam and the end surface being in contact are respectively formed as a convex/concave surface, or the cam structure can includes a mobile cam and a matched fixed cam thereby forming a hinge with auto locking function for automatically locking and positioning when the opening or engaging operation reaching a preset angle range; or as shown in FIG. 14, each edge of the corresponding supporter (20') close to each of the pivotal shafts (50a~50h) is radially extended with at least a covering segment (23), the at least one covering segment (23) of each edge is covered along the periphery of each of the pivotal shafts (50a~50h) and formed with an axial opening (231), so an effect of providing relatively lighter unfolding torque and relatively heavier engaging torque is achieved; the mentioned covering segment is not limited to be formed on the corresponding supporter, the covering segment can also be formed on the supporter, the connecting supporter or the two connection bars.

Figure 15:
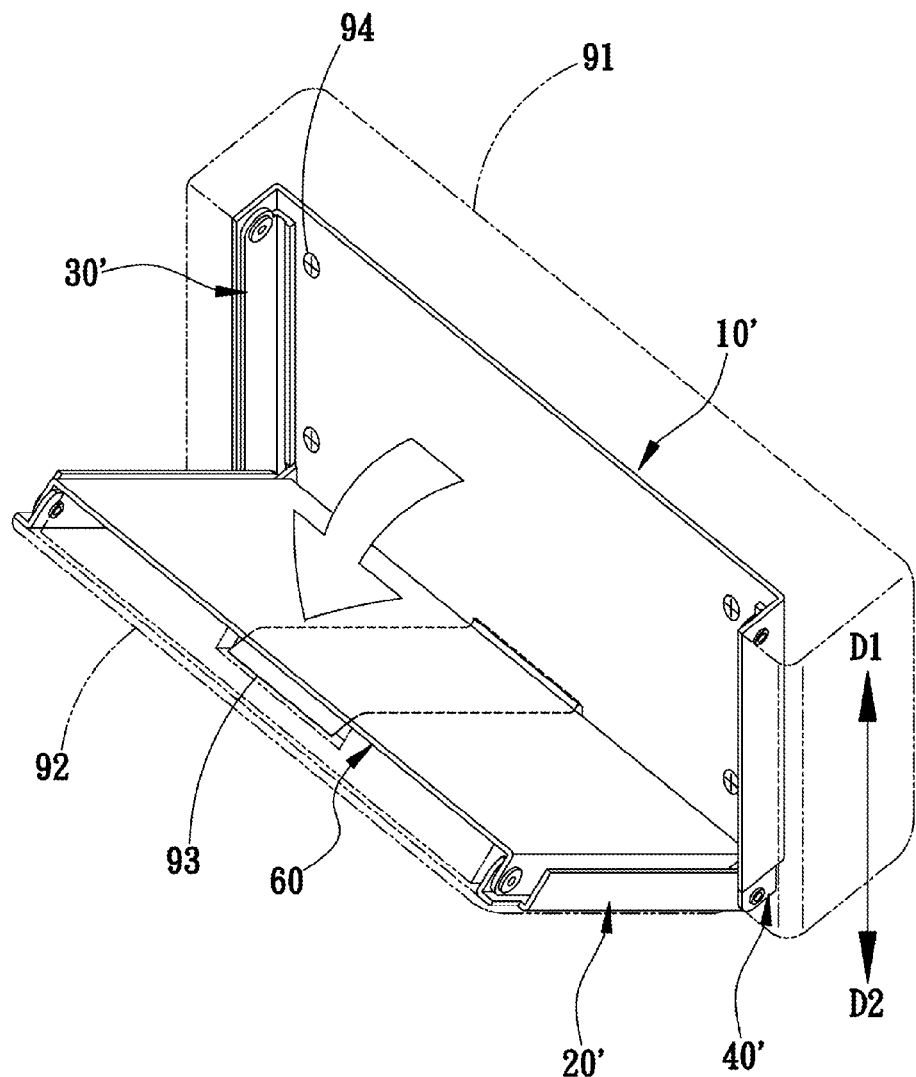
FIG. 15 is a schematic view illustrating the connecting device shown in FIG. 10 being respectively connected to a machine housing and a screen.

According to the two embodiments, for enabling the connecting device of the present invention to be applied in an electronic product, as shown in FIG. 15, the surface (e.g. a recess formed in the central area) of the supporter (10, 10') and the corresponding supporter (20, 20') is respectively installed with a locking structure (94) (e.g. fasten holes matching with screws, or buckling, magnets and adhesive sheets can also be adopted) for respectively locking a machine housing (91) and a screen (92) of the electronic product, and with the two connection bars (30, 40) disclosed in the first embodiment, or with the two connection bars (30', 40') and the connecting supporter (60) disclosed in the second embodiment, the screen (92) is enabled to be linked with the two connection bars (or the two connection bars and the connecting supporter) for being rotated and unfolded in two opposite directions, so the screen (92) is able to be opened and engaged relative to the machine housing (91) in sequence; when being in the engaged status, the whole connecting device can be thinner for reducing the volume, the whole thickness is less likely to be affected by the installation of the supporter and is enabled to be similar or equal to the thickness of the hinge thereby being facilitated to be hidden and installed on the screen (92) or a side wall of the machine housing (91); openings can be optionally formed on the surface of the supporter (10, 10'), the corresponding supporter (20, 20') or the connecting supporter (60) (referring to FIG. 15, at the bottom of the supporter (10'), a connecting wire (93) for connecting the machine housing (91) passes an opening formed near the opposite end of the supporter (10') then passes a gap formed between the connecting supporter (60) and the corresponding supporter (20') then passes around one end of the corresponding supporter (20') for being connected to the screen (92)), so the connecting wire (93) (e.g. a wire or a flexible flat wire) is allowed to pass for electrically connecting the machine housing (91) and the screen (92), the whole appearance can be prettified and more convenience in use is provided, when being applied in an image capturing device such as a digital camera, the screen is enabled to be rotated and adjusted towards a direction corresponding to the high or low image capturing location thereby providing convenience to users.

Figure 16:
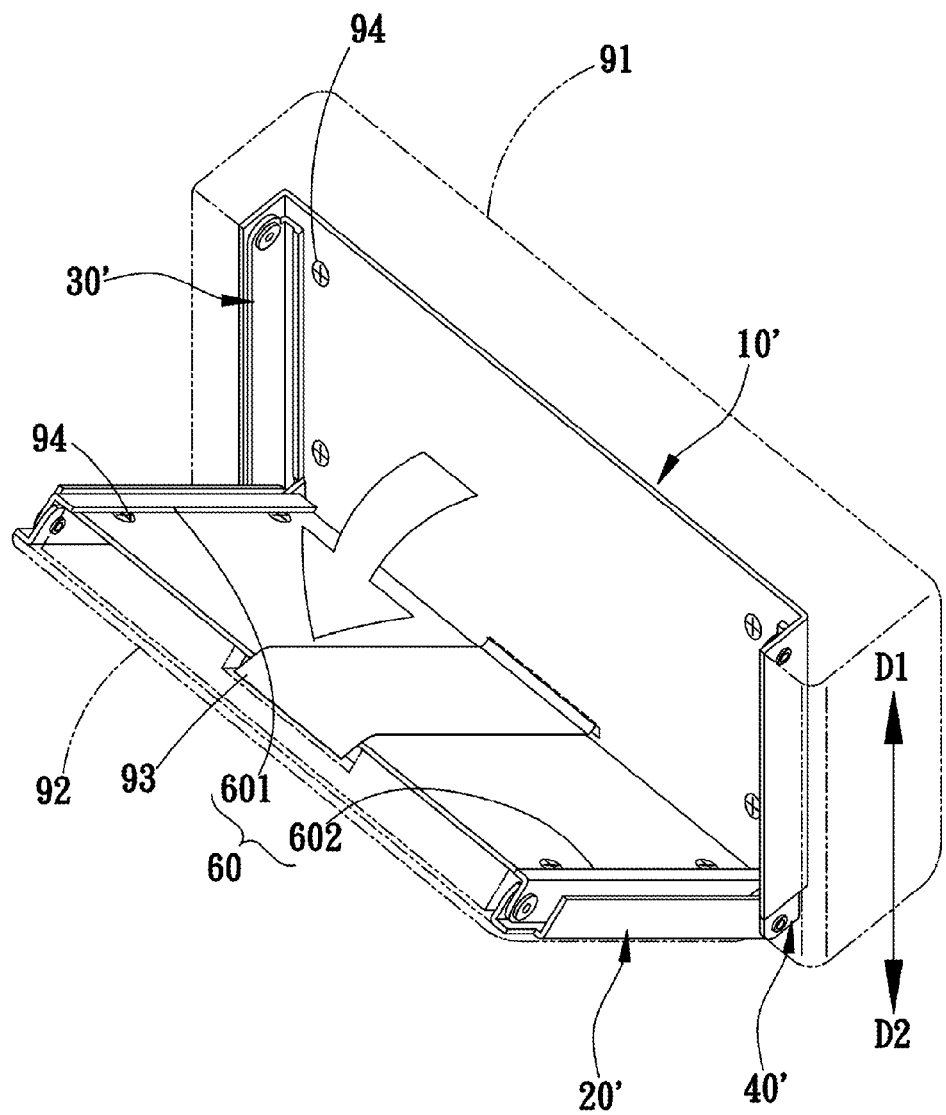
FIG. 16 is another schematic view illustrating the connecting device shown in FIG. 10 being respectively connected to the machine housing and the screen.

According to the present invention, any one of the supporter (10'), the corresponding supporter (20') and the connecting supporter (60) can be formed as a single supporting structure, or formed as two supporting structures parallel to each other, so a space is formed between the two supporting structures for accommodation components such as the connecting wire (93), as shown in FIG. 16, the connecting supporter (60) is formed as two supporting structures (601, 602).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A connecting device capable of opening and engaging in dual directions, including:
    a supporter;
    a corresponding supporter, engaged with said supporter; and
    two connection bars, parallel to each other, each of said connection bars being respectively parallel to said supporter and said corresponding supporter, two ends of each of said connection bars being respectively pivoted with said supporter and said corresponding supporter, so said corresponding supporter being allowed to be rotated and unfolded towards an end direction of said supporter, or rotated and unfolded towards an opposite end direction of said supporter, thereby forming the dual-directional opening operation.

2. The connecting device capable of opening and engaging in dual directions according to claim 1, wherein two opposite sides of said supporter are respectively provided with a first bending sheet and a second bending sheet, two opposite sides of said corresponding supporter are respectively provided with a third bending sheet and a fourth bending sheet; thereby generating a gap due to the mutual support provided by said supporter and said corresponding supporter when said corresponding supporter being engaged with said supporter.

3. The connecting device capable of opening and engaging in dual directions according to claim 2, wherein a pivotal shaft is respectively installed at the location where each of said connection bars, said first bending sheet, said second bending sheet, said third bending sheet and said fourth bending sheet are pivoted, said four pivotal shafts are arranged with a means of every two being coaxial with each other, and said two coaxial pivotal shafts are parallel to said other two coaxial pivotal shafts, so said supporter and said corresponding supporter having the same or different dimension are enabled to be horizontally displaced relative to each other in the axial direction, thereby being staggeringly engaged or correspondingly engaged.

4. The connecting device capable of opening and engaging in dual directions according to claim 3, wherein each of said pivotal shafts includes an axial core member and a fasten member pivotally connected to each other, two ends of said axial core member are respectively formed as a stop part and a connection part, said fasten member is correspondingly pivoted with said connection part.

5. A connecting device capable of opening and engaging in dual directions, including:
   a supporter;
   a connecting supporter, pivoted with said supporter and capable of being mutually engaged;
   a corresponding supporter, pivoted with said connecting supporter and capable of being mutually engaged, thereby enabling said connecting supporter to be disposed between said supporter and said corresponding supporter; and
   two connection bars, parallel to each other, and disposed at two opposite sides of said supporter, said corresponding supporter and said connecting supporter capable of being mutually engaged, wherein one end of said corresponding supporter being pivoted with one end of said connecting supporter, two ends of each of said connection bars being respectively pivoted with one end of said supporter and the opposite end of said corresponding supporter, and the opposite end of said connecting supporter being pivoted with the opposite end of said supporter, so said corresponding supporter and said two connection bars being allowed to be rotated and unfolded towards an end direction of said supporter, or said corresponding supporter and said connecting supporter being allowed to be rotated and unfolded towards an opposite end direction of said supporter, thereby forming the dual-directional opening operation.

6. The connecting device capable of opening and engaging in dual directions according to claim 5, wherein two sides of said supporter are respectively installed with outer block sheets and inner block sheets arranged with intervals, each of said connection bars are respectively accommodated and positioned between each of said inner block sheets and each of said outer block sheets; two sides of said corresponding supporter are respectively installed with a bending structure having an accommodation part, two sides of said connecting supporter are respectively installed with a corresponding bending structure, each of said corresponding bending structures is guided and positioned in said accommodation part of each of said bending structures.

7. The connecting device capable of opening and engaging in dual directions according to claim 6, wherein a first pivotal part and a seventh pivotal part are respectively installed at two sides defined at one end of said supporter, an eighth pivotal part and a second pivotal part are respectively installed at two sides defined at the opposite end of said supporter; a third pivotal part and a fifth pivotal part are respectively installed at two sides defined at one end of said corresponding supporter, a sixth pivotal part and a fourth pivotal part are respectively installed at two sides defined at the opposite end of said corresponding supporter; two ends of said connection bar are respectively pivoted with said first pivotal part and said sixth pivotal part, two ends of said other connection bar are respectively pivoted with said seventh pivotal part and said fourth pivotal part; two sides defined at one end of said connecting supporter are respectively pivoted with said third pivotal part and said fifth pivotal part, two sides defined at the opposite end of said connecting supporter are respectively pivoted with said eighth pivotal part and said second pivotal part.

8. The connecting device capable of opening and engaging in dual directions according to claim 7, wherein pivotal shafts are respectively installed at the locations where said supporter and said corresponding supporter being pivoted with said connecting supporter and said two connection bars, each of said pivotal shafts is further sleeved with a torsion spring.

9. The connecting device capable of opening and engaging in dual directions according to claim 7, wherein pivotal shafts are respectively installed at the locations where said supporter and said corresponding supporter being pivoted with said connecting supporter and said two connection bars, each of said pivotal shafts is further installed with a cam structure.

10. The connecting device capable of opening and engaging in dual directions according to claim 7, wherein pivotal shafts are further respectively installed at the locations where said supporter and said corresponding supporter being pivoted with said connecting supporter and said two connection bars, each edge of said corresponding supporter close to each of said pivotal shafts is extended with at least a covering segment, said at least one covering segment of each edge is respectively covered along the periphery of each of said pivotal shafts.

11. The connecting device capable of opening and engaging in dual directions according to claim 7, wherein any one of said supporter, said corresponding supporter and said connecting supporter is able to be formed as two supporting structures parallel to each other.

12. The connecting device capable of opening and engaging in dual directions according to claim 6, wherein said accommodation part of each of said bending structures is formed as an elongated groove formed through bending two sides of said corresponding supporter, opposite corners of each of said elongated grooves are respectively formed with a notch for the purpose of pivotal connection; each of said corresponding bending structures is formed as a wing sheet formed through bending two sides of said connecting supporter, the distal end of each of said wing sheets is allowed to be exposed at said notch of each of said elongated grooves; one side of each of said connection bars is respectively installed with an extending part, each of said extending parts is formed with a positioning groove allowing said edge of each of said bending structures to be abutted.

* * * * *